United States Patent [19]
Feller

[11] Patent Number: 5,948,978
[45] Date of Patent: Sep. 7, 1999

[54] INDUCTION HEATED MASS FLOW SENSOR

[76] Inventor: Murray F. Feller, Rt. 2, Box 562A, Micanopy, Fla. 32667

[21] Appl. No.: 09/114,763

[22] Filed: Jul. 14, 1998

[51] Int. Cl.$^6$ .......................................................... G01F 1/68
[52] U.S. Cl. ................................. 73/204.15; 73/204.25; 73/204.15; 73/204.27; 324/706; 324/725; 374/54
[58] Field of Search .................... 73/204, 861.11, 73/204.25, 204.15, 204.27, 703; 137/870, 482.5; 251/65, 129.01; 374/54; 324/706, 725

[56] References Cited

U.S. PATENT DOCUMENTS

| | | |
|---|---|---|
| 3,777,561 | 12/1973 | Lewis . |
| 3,802,262 | 4/1974 | Banks . |
| 3,897,684 | 8/1975 | Dewan . |
| 3,903,741 | 9/1975 | Greene . |
| 3,967,500 | 7/1976 | Forster . |
| 4,195,515 | 4/1980 | Smoll . |
| 4,825,703 | 5/1989 | Kubota . |
| 5,461,913 | 10/1995 | Hinkle et al. ............................... 204/15 |
| 5,691,484 | 11/1997 | Feller . |

FOREIGN PATENT DOCUMENTS

| | | |
|---|---|---|
| 0 069 456 A 1 | 1/1983 | European Pat. Off. . |
| 1 231 447 | 12/1966 | Germany . |
| 1 648 143 | 3/1971 | Germany . |
| 30 00 965 A 1 | 1/1980 | Germany . |
| 33 29 899 A 1 | 8/1983 | Germany . |
| 37 00 165 A 1 | 1/1987 | Germany . |
| 2-280012 | 11/1990 | Japan . |

*Primary Examiner*—Harshad Patel
*Assistant Examiner*—Alvin Pardo
*Attorney, Agent, or Firm*—Harness Dickey & Pierce P.L.C.

[57] ABSTRACT

Sensors for measuring the flow rate of a fluid and for monitoring heat transfer. An induction-heated temperature-responsive sensor in contact with and cooled by the fluid, changes temperature in proportion to the quantity of heat removed by the fluid thereby providing a basis for determining flow rate or heat transfer. A flow modulation method and apparatus for improving the precision of flow rate measurement is also presented.

26 Claims, 3 Drawing Sheets

INDUCTION HEATED MASS FLOW SENSOR

BACKGROUND OF THE INVENTION

1. Technical Field

The present invention relates to an induction method for heating an electrically-responsive, temperature-sensitive element exposed to a fluid flow whereby a measurement of the removal of heat by the fluid flow alters the electrical characteristics of the element to produce a signal useful in determining the flow rate of the fluid and heat transfer to the fluid. The present invention further relates to a means for modulating the flow rate of the fluid in contact with the element to improve the precision of measurement.

2. Discussion

Mass flow sensors of the thermal type typically employ a tube which is electrically heated to reach a specific temperature above the temperature of the fluid flowing through the tube. A measurement of the electrical energy required to maintain this temperature difference while compensating for insulation losses, indicates mass flow rate of the fluid. The tube may incorporate an electrically insulated and thermally coupled wire coil on its outside surface through which an electric current flows. The wire may be of a temperature-sensitive type whereby its electrical resistance can serve also to indicate tube temperature or a separate sensor may be used for this function. It is likely that there will be at least some temperature difference present between the tube surface exposed to the fluid flow and the temperature sensor regardless of the form which the sensor may take. This is because of insulation and conductive losses of the sensor and the thermally insulating barrier between the tube and sensor, which are necessitated by the need to electrically insulate the sensor from the tube. This temperature difference is a source of flow measurement error. The temperature difference will be relatively large under the condition of high heat removal rates, as may be experienced with high velocity gases such as on steam or compressed air lines, or liquids such as water, and may therefore be a source of substantial flow measurement error. Furthermore, the overall thermal mass of the added heating wire and sensor increases the response time to changes in fluid flow rate and, in some applications, for example when used in a control system to regulate flow rate, may be a large factor in the overall system responsiveness.

The reduction in thermal mass is an advantage when flow modulation techniques are employed because the modulation frequency is limited by the response time of the heated tube. A higher modulation frequency enables the sensor to respond more quickly to changes in flow rate.

The present invention is further applicable to any instrumentation using a fluid-contacted surface with an objective being to heat the surface and measure the temperature change of that surface due to the effects of contact with the fluid, and where additional factors such as a thermally insulating coating or film on the fluid-contacted surface would otherwise affect the heat transfer between the surface and fluid.

SUMMARY OF THE INVENTION

The above and other objects are provided by an induction heated mass flow sensor in accordance with preferred embodiments of the present invention. In one preferred embodiment fluid flow passes through an electrically conductive tube which is located inside of but not in contact with a coil of wire, through which an alternating electrical current flows. The tube acts as a shorted turn secondary of a transformer, and is thereby induction heated. The material from which the tube is fabricated is selected to exhibit a large electrical resistance change with temperature so that the ratio of its induced voltage to current, as reflected back into the primary coil, may be used to determine its temperature. Fluid flowing through the tube absorbs heat from the tube surface, thereby changing its temperature as a measure of fluid flow rate.

In another preferred embodiment, the sensing error of an induction-heated temperature-responsive tube due to fluid temperature is compensated by a measurement of the fluid temperature which is used as a reference. A separate temperature sensor may be used for this purpose. Alternatively, the induction-heated temperature-responsive tube may be time-shared in operating modes so it can also function as the fluid temperature sensor. As a temperature sensor, the tube would be permitted to stabilize at the fluid temperature, after which it would be energized and its resistance determined very quickly, before the tube significantly changes temperature.

In a further preferred embodiment the invention comprises an induction-heated, temperature-responsive tube. The tube contains a fluid flow which is modulated in flow rate from a minimum to a maximum so that the temperature of the tube, and thus its electrical resistance, also varies from a minimum to a maximum. An output signal based upon the periodic resistance change is passed through a high-pass filter to remove the DC and very low frequency components which represent slow drifts, to thereby minimize their contribution of measurement error. Two such induction-heated temperature-responsive tubes alternately exposed to the fluid flow provide a balanced output with outstanding transient response to changes in fluid flow rate.

In yet another preferred embodiment of the invention, an induction-heated temperature-responsive tube contains a fluid flow in which the extraction of heat by the fluid from the tube, and the resulting tube temperature drop, is a function of the heat transfer between the tube surface in contact with the fluid and the fluid.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
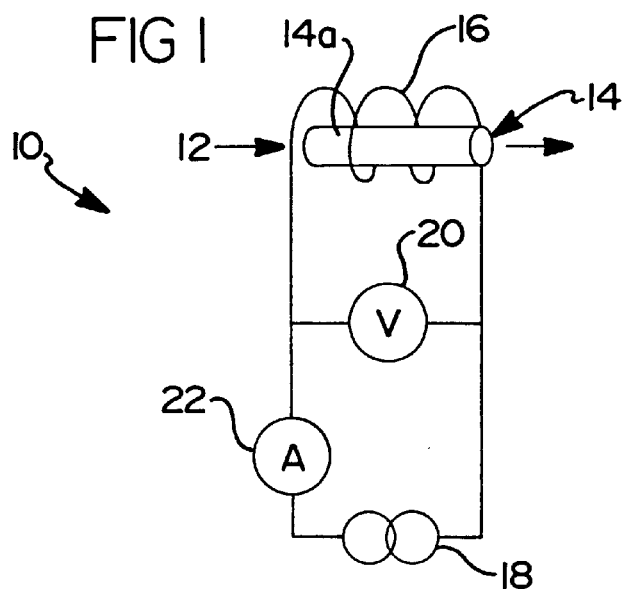
FIG. 1 is a simplified schematic diagram of an induction heated tube in a flow sensor in accordance with a preferred embodiment of the present invention.

Referring to FIG. 1, a flow sensor 10 in accordance with a preferred embodiment of the present invention is shown.

Fluid flow, represented by arrow 12, enters a tube 14 surrounded by a wire coil 16. Both the coil 16 and the outer surface 14a of the tube 14 are thermally insulated from the fluid flow. An AC generator 18 provides an electrical signal to the coil 16 whereby the voltage is measured by a voltmeter 20 and current measured by an ammeter 22. Tube 14 is an electrical conductor and acts as a shorted secondary of a transformer with coil 16 as the primary. Tube 14 is then heated to raise its temperature above that of the fluid flow 12. The fluid 12 flowing through the tube 14 removes heat from the tube 14 as a function of its flow rate producing a corresponding change in the temperature of tube 14.

Tube 14 is typically made from a metal such as nickel which, in a commercially available pure state, exhibits a high temperature coefficient of resistance of about 6000 parts per million per degree centigrade. As such, the tube 14 exhibits a significant resistance change as its temperature changes. The coil 16, acting as a transformer primary, reflects in its respective voltage and current ratio, the voltage and current ratio in its secondary, the tube 14, and how this ratio, as a function of resistance, changes with flow rate.

The cylindrical shape of tube 14 offers such general advantages as uniformity, high strength for pressure applications and ease of implementation in the present invention. The cylindrical shape also facilitates pressure sealing, for example with o-rings, and replacement of the tube 14. Replacement of the tube 14 may be important, for example, when the heat exchange surface is degraded by a thermally insulating coating. It is noted that tube 14 replacement is presently relatively difficult to accomplish with conventional mass flow sensors using an attached heating coil because of the difficulty in handling the coil and wires.

For some applications the tube 14 can be made differently. For example, on the outside of a tube made of one metal type with low temperature coefficient of resistance but having other useful properties such as corrosion resistance, high strength or low cost, a thin coating of another metal can be deposited. The thin coating of metal can have a high temperature coefficient of resistance and preferably a lower specific resistance to dominate as the secondary winding. This approach is aided by the skin effect phenomena, whereby as the operating frequency increases the current concentrates in the outermost surface of the tube. Another example is of a thermally insulating ceramic tube serving as the substrate for a deposited coating of a metal on its interior having a high temperature coefficient of resistance or even a resistive mixture as might be used in thermistors. The coating could also rely on dielectric losses for producing the heat. Furthermore, the outside surface or the inside surface, or even both surfaces, of the tube 14 can be exposed to the fluid flow 12. Alternatively, the tubes 14 could be of other shapes such as flat plates or discs.

In some applications the change in resistance of tube 14 over the flow range may be relatively small compared to the influence of the temperature of the fluid flow 12. Substantial flow measurement error could thereby result. To reduce such error, a measurement of the temperature of the fluid flow 12 is performed and serves as a reference for temperature compensation. Ideally, the sensor would have the same temperature verses resistance characteristic as the tube 14 and thereby enable compensation, and particularly zero drift, to be performed over a wide temperature range.

The very great range of construction materials, design and shape of tube 14 made possible by the present invention and the absence of thermal mass relating to added heater windings and temperature sensors enable such tubes to have low thermal mass so that they can respond relatively fast to changes in fluid flow 12 rate. Furthermore, even though the fluid flow 12 is preferably through the center of the tube 14, it is convenient for the outside of the tube 14 to also experience the same fluid pressure. In this manner the tube 14 wall, no longer having to withstand such pressure, can be very thin, and consequently of very low thermal mass, and able to change temperature more quickly.

The form of the hardware for detecting the change in electrical characteristics of the heated tube 14 with temperature change can vary considerably. For example, the coil 16 can be part of a tuned circuit controlling the frequency of the induced signal. This will, under the influence of the shorted turn represented by the tube 14, affect the signal frequency accordingly, thereby becoming an indicator of tube 14 temperature. Further, the fluid flow 12, when exhibiting physical characteristics which enable it to be directly induction heated and temperature sensed, may be acted upon by the induction of coil 16 without the intermediary of tube 14.

Figure 2:
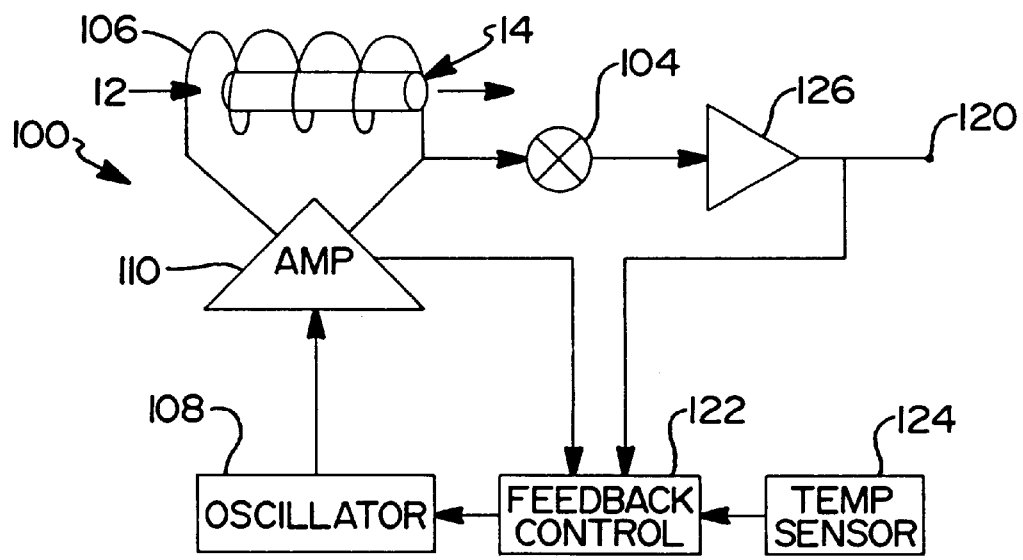
FIG. 2 is a block diagram illustrating the functional blocks of an electronic circuit for heating a tube and sensing the change in its electrical resistance due to heat removal by a fluid flow.

FIG. 2 illustrates an example of a simplified block diagram of a suitable electronic circuit 100 which will inductively heat tube 14 and extrapolate an output signal responsive to the mass flow rate of fluid flow 12. The electrical resistance of tube 14 changes significantly with temperature and represents the ratio of its voltage to current, both of which can be measured indirectly by examining the reflected voltage to current ratio of the primary winding 106. The current applied to the primary winding 106 is controlled allowing a voltage across the winding 106 to respond to (and therefore reflect) the change in resistance of the tube 14. The current is controlled about the point where the ratio of voltage to current represents the desired rise of tube 14 temperature over that of the fluid flow. A fluid temperature sensor 124 provides a signal corresponding to the fluid temperature to modify the ratio of the voltage-to-current over a wide range of fluid temperatures so that the increment in temperature of the tube 14 over that of the fluid 12 remains constant. Maintaining this temperature rise constant is desirable for making a mass flow rate measurement over a wide range of operation.

Oscillator 108 provides an AC signal to the power amplifier 110 driving coil 106, which is inductively coupled to tube 14. The coil 106 current is regulated with a feedback control 122. The coil 106 AC voltage is detected by the amplitude detector 104 and increased in magnitude by amplifier 126 to provide a DC voltage output at 120. The output at 120 is compared in feedback control 122 to the coil 106 current signal for controlling the magnitude of the oscillator signal to regulate the power induced into tube 14 and to maintain constant the ratio of the coil 106 voltage to its current regardless of the heat removed from tube 14 by the fluid flow 12.

The fluid temperature sensor 124 is provided to compensate for measurement errors due to changes in the fluid temperature. A signal from the sensor 124 adjusts the offset of feedback control 122 to modify the voltage-to-current ratio control so that the tube 14 temperature is ideally maintained a constant amount (i.e., increment) above that of the flowing fluid for any condition of flow rate and fluid temperature. Since the temperature of the tube 14 is maintained constant over a wide flow range, the output signal 120 tends to respond quickly to flow rate changes through the tube 14.

The present invention may readily be used for monitoring heat transfer by operating oscillator 108 open loop to produce a stable amplitude signal into amplifier 110, whereby the resistance of tube 14 as determined above is indicative of heat transfer to the fluid 12. Over a period of operation, the heat transfer will decrease because of the accumulation of thermally insulating coatings on the surface of tube 14. This results in an increase in tube 14 temperature over that of the fluid 12 and, when so detected, will indicate the need for maintenance or other corrective action. If the rate of the fluid flow 12 is subject to change, the heat transfer will also change, thereby requiring a flow measurement to be made for isolating any changes in heat transfer due strictly to the accumulation of thermally insulating coatings.

Figure 3:
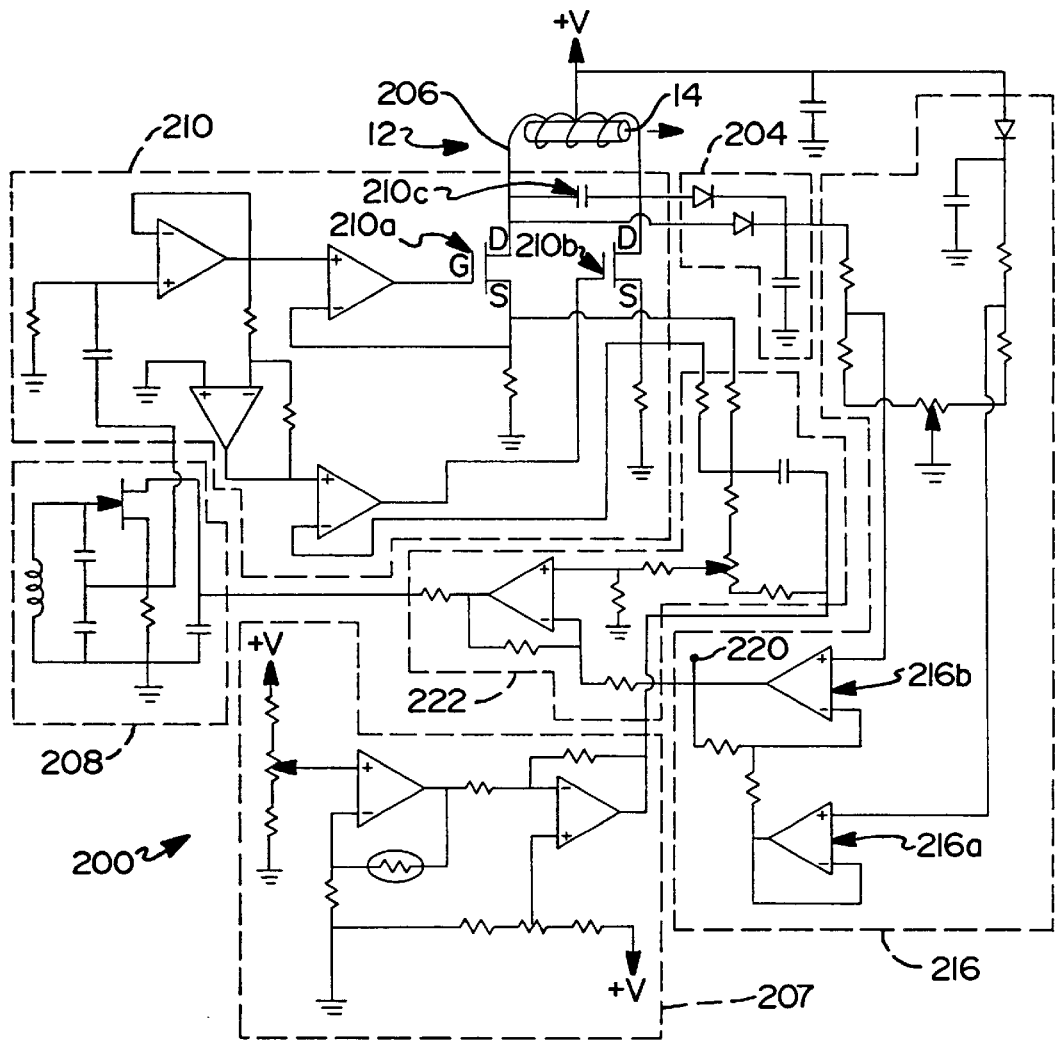
FIG. 3 illustrates an electrical schematic diagram for FIG. 2.

FIG. 3 illustrates an example of a simplified electrical schematic diagram of a circuit 200 which inductively heats the tube 14 through which fluid flow 12 is passing and provides an output signal 220 responsive to the mass flow rate of the fluid 12. The induction heating part of the present invention is also generally applicable to modulated flow and heat transfer measuring instruments.

Oscillator 208 generates a signal typically in the range of a few hundred kilohertz to several megahertz depending upon the design of the tube 14 and its materials of construction. The oscillator 208 is cable of being controlled in amplitude over a wide range by the supply voltage received from a feedback control 222. The oscillator signal 208 is amplified and phase inverted in a power amplifier 210 to drive two power FETs 210a and 210b in pushpull fashion. Each of the FETs 210a and 210b is controlled with a feedback loop within the amplifier 210 block to provide precise current representations of the oscillator 208 voltage to coil 206. A capacitor 210c in the power amplifier 210 resonates with coil 206 at the oscillator 208 frequency so that the FET current is minimum and typically dominated by the shorted secondary represented by the tube 14. An amplitude detector 204 is full wave and detects the coil 206 AC voltage. Since the coil 206 is biased at a power supply potential, the variations of that potential are compensated for with a detector 216a and differential amplifier 216b within the amplifier 216 block. Alternatively, a separate winding around coil 206 could be used to provide a signal representative of the coil AC voltage. The output from the fluid temperature sensor 207 offsets the feedback controller 222 current representing signal to compensate for the temperature of the fluid flow 212.

Figure 4:
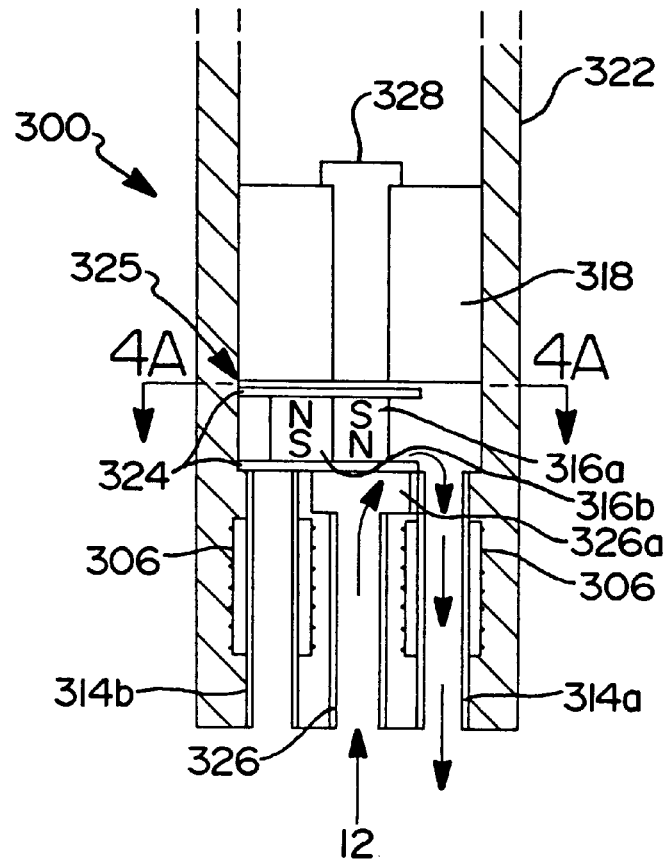
FIG. 4 illustrates a side cross-sectional view of a preferred embodiment of the mass flow sensor of the present invention using flow modulation.

Referring to FIG. 4, a flow sensor 300 in accordance with a preferred embodiment of the present invention is shown. Fluid flow 12 enters a centrally positioned flow tube 326 having an expanded open (i.e., enlarged) end 326a. The fluid 12 is routed either through heated tube 314a or through heated tube 314b before exiting the flow sensor 300. The tubes 314 are induction heated by coils 306. Two magnets 316 oriented with opposing polarities are located between two non-magnetic armature plates 324 which can slide to the left or to the right to block off either one of the heated tubes 314. An electromagnet 318 with a magnetic core 328 produces a magnetic flux to magnetically attract or repel the magnets 316. A housing 322 encloses and protects the above-described components.

As illustrated in FIG. 4, the path of the fluid flow 12 is blocked from entering the left tube 314b and can therefore only pass into and through the right tube 314a. However, when the electromagnet 318 is energized to produce a south pole below, its flux repels the right magnet 316a while attracting the left magnet 316b. This causes the assembly of the two magnets 316 and armature plates 324, which functions as a valve member 325, to slide to the right, thus blocking off the right tube 314a while permitting the fluid flow 12 to pass into and through the left tube 314b. By alternating the polarity of the current through the electromagnet 318, the valve member 325 is caused to move alternately to the left and the right. The fluid flow 12 is thus caused to be alternately directed between the left and right tubes 314 so that while the flow 12 through one tube 314 is modulated from a minimum to a maximum, the flow through the other tube 314 is modulated from a maximum to a minimum. This means of modulating the fluid flow 12 may also be used when the tubes 314 are heated with heating elements in direct contact with the tubes 314. It will also be appreciated that only a single tube 314 could be employed and the flow therethrough modulated from a maximum to a minimum. Whether one or a plurality of tubes 314 are employed, each tube 314 preferably incorporates some resistive component in order to dissipate power, which could be provided with semiconductor or losse dielectric in addition to a nominal metal such as nickel.

Figure 4A:
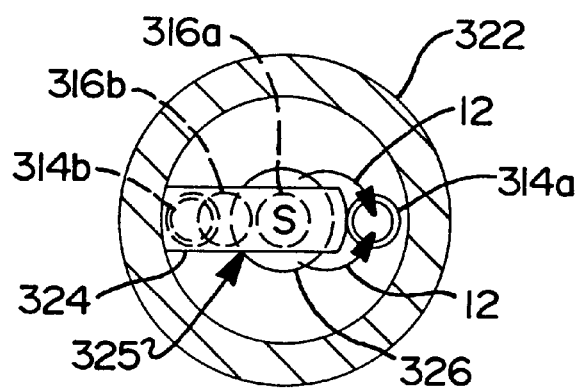
FIG. 4A illustrates a partial cross-section top view in accordance with section line 4A—4A in FIG. 4 of the modulator elements shown in FIG. 4.

FIG. 4A is a sectional view illustrating how the fluid flow 12 is permitted by the positioning of the armature plates 324 to pass through the end portion 326 to the right tube 314a and is blocked from doing so through the left tube 314b. The magnet 316a on the right is under the electromagnet 318.

Omitted from FIG. 4A for clarity is a slot or other guide for the magnet 316 and armature plate 324 assembly which would serve to maintain its alignment over the flow passage openings. Although a linear sliding motion is illustrated, the motion may also be circular and bearing supported.

While not necessary for the basic operation of the flow modulator, the magnetic core 328 concentrates the magnetic flux to more efficiently interact with the magnets 316. It also provides a magnetic latch so that when the electromagnet 318 is not energized the last position of the armature plates 324 is retained. Without the magnetic core 328, a spring, gravity or some external force will be required to return the plates 324 and magnets 316 to their original position. When the electromagnet 318 is energized to alternate the polarity of its magnetic flux so that it is the same as that of the magnet 316 pole directly under it, the repelling force experienced by that magnet 316 will first force it down and then to a side as all of the magnetic and inertial forces are expressed. This mechanical movement will tend to break the armature plates 324 free of any coating or debris which might tend to cause them to stick or jam.

Those skilled in the art can now appreciate from the foregoing description that the broad teachings of the present invention can be implemented in a variety of ways. Therefore, while this invention has been described in connection with particular examples thereof, the true scope of the invention should not be so limited since other modifications will become apparent to the skilled practitioner upon a study of the drawings, specifications and following claims.

What is claimed is:

1. A flow sensor for measuring the rate of flow of a flowing fluid, said flow sensor comprising:

a temperature sensing element having an electrical resistance which varies in relation to its temperature thereof, said temperature sensing element being disposed to contact the flowing fluid, said element being in close proximity to a coil having an alternating current passed therethrough such that the coil electromagnetically induces a current flow through the temperature sensing element to thereby inductively heat said element to maintain said element at a temperature above that of said flowing fluid, said element being adapted to exhibit a resistance change indicative of a change in the temperature thereof in response to said fluid flowing in contact therewith; and a detection system responsive to said resistance change for extrapolating therefrom a flow signal, said flow signal being representative of a flow rate of said flowing fluid in contact with said temperature sensing element.

2. The flow sensor of claim 1, wherein said temperature sensing element comprises a tubular, thermally responsive member.

3. The flow sensor of claim 1, wherein said temperature sensing element comprises:

a tubular, thermally responsive member; and a current conducting coil wound around said thermally responsive member and electrically isolated from said thermally responsive member for inductively heating said thermally responsive member and responding to changes in the temperature of said thermally responsive member.

4. The flow sensor of claim 3, wherein said detection system comprises:

an oscillator for generating an alternating current signal applied to said coil;

a power amplifier for amplifying said alternating current signal to said coil;

a temperature sensor for monitoring a temperature of said flowing fluid and generating an output signal in accordance therewith; and a feedback control system responsive to an output signal from said temperature sensor and to said alternating current signal applied to said coil to generate a feedback signal which operates to modify said alternating current signal to thereby maintain said inductively heated thermally responsive member at a constant temperature increment above said temperature of said flowing fluid.

5. The flow sensor of claim 1, further comprising a system for modulating the fluid flow in contact with said temperature responsive element.

6. The flow sensor of claim 5, wherein said system for modulating the fluid flow in contact with said temperature responsive element includes a system for periodically interrupting said fluid flow.

7. A flow sensor for measuring the rate of flow of a flowing fluid based on an amount of heat removed from an element in contact with said flowing fluid, said flow sensor comprising:

a temperature sensing element having an electrical resistance which varies in relation to its temperature, said temperature sensing element being disposed so as to contact the flowing fluid;

an electrically conductive heating element disposed in close proximity to said temperature sensing element for controllably inductively heating said temperature sensing element such that said sensing element is maintained at a temperature above that of said flowing fluid, and further being responsive to a change in the temperature of said sensing element;

a system for generating an alternating current electrical signal which is applied to said heating element, to thereby electromagnetically induce a current flow in said temperature sensing element, to thereby inductively heat said sensing element;

a temperature sensing member for sensing the temperature of said flowing fluid and generating a signal in accordance therewith;

a feedback system for monitoring said signal from said temperature sensing member and said alternating current electrical signal and modifying said alternating current electrical signal to maintain said inductively heated temperature sensing element at a desired temperature increment above that of said flowing fluid; and a detection system responsive to said alternating current electrcal signal for extrapolating therefrom a flow signal, said flow signal being representative of a flow rate of said flowing fluid in contact with said temperature sensing element.

8. The flow sensor of claim 7, wherein said temperature sensing element comprises a tubular member; and wherein said heating element comprises an electrically conductive coil circumscribing said tubular member.

9. The flow sensor of claim 7, further comprising a flow modulating system for alternately interrupting said fluid flow to said temperature sensing element.

10. The flow sensor of claim 7, wherein said temperature sensing element comprises a central tubular member flanked by a pair of heated tubular members; and wherein said flow sensor further comprises a modulating system for alternately directing said fluid flow through said central tubular member through each of said heated tubular members such that said fluid flow is at a maximum through a first one of said heated tubular members when a second one of said heated tubular members is closed off, and such that said fluid flow is at a maximum through said second one of said heated tubular members when said first one of said heated tubular members is closed off, to thereby generate a pair of said cyclical electrical signals.

11. The flow sensor of claim 10, wherein said modulating system comprises:

an electromagnet;

a pair of permanent magnets disposed adjacent said electromagnet and responsive thereto;

a valve member sufficiently large to cover one of an open end of each of said heated tubular members and being operably associated with said permanent magnets; and said valve member being responsive to movement of said permanent magnets caused by energization of said electromagnet for moving said valve member from a first position, wherein said valve member blocks said fluid flow through only said first one of said heated tubular members, into a second position wherein said valve member blocks said fluid flow through only said second one of said heated tubular members, such that only one of said pair of heated tubular members at a time is able to pass said fluid flow therethrough.

12. The flow sensor of claim 11, further comprising a magnetic core associated with said electromagnet.

13. A flow sensor for measuring a rate of a fluid flow, said sensor comprising:

an electrically conductive, thermally responsive flow sensing element disposed in contact with said fluid flow;

an electrically conductive coil circumscribing said flow sensing element;

a system for applying an alternating current electrical signal to said flow sensing element to inductively heat said flow sensing element, said alternating current signal being modified by a change in an electrical resistance of said flow sensing element as a result of a change in temperature thereof caused by heat removed therefrom as a result of contact of said flow sensing element with said fluid flow;

a temperature sensing element disposed in said fluid flow for generating an output signal indicative of a temperature of said fluid flow;

a closed loop feedback monitoring system for monitoring said output signal and modifying said alternating current electrical signal to maintain said flow sensing element at a desired temperature increment above said temperature of said fluid flow; and a detection system for extrapolating from said alternating current electrical signal a flow rate of said fluid flow.

14. The flow sensor of claim 13, wherein said flow sensing element comprises a central tubular member having first end and a second end, and first and second adjacently positioned, inductively heated flow tubes in fluid communication with said central tubular member through which said fluid flow must flow.

15. The flow sensor of claim 14, further comprising a flow modulating system for alternately permitting said fluid flow substantially entirely through only one of said flow tubes at a time.

16. The flow sensor of claim 15, wherein said flow modulating system comprises:

a valve member for controlling flow through said first and second flow tubes; and a system for controlling said valve member such that said valve member alternately opens only one of said first and second flow tubes at a time, to thereby produce an alternating flow of said fluid flow through each of said first and second flow tubes.

17. The flow sensor of claim 16, wherein said system for controlling said valve member comprises:

an electromagnet responsive to said detection system; and a pair of permanent magnets operably associated with said valve member, wherein energization of said electromagnet causes movement of said permanent magnets to cause said valve member to move from a first position to a second position, wherein said first flow tube is opened to receive said fluid flow, and said second flow tube is closed by said valve member, and wherein reversal of the current applied to said electromagnet causes said valve member to be urged from said second position back into said first position, wherein said first flow tube is closed by said valve member and said second flow tube is opened to permit said fluid flow therethrough.

18. The flow sensor of claim 17, further comprising a magnetic core associated with said electromagnet.

19. The flow sensor of claim 16, wherein said system for controlling said valve member comprises:

an electromagnet responsive to said detection system; and a pair of permanent magnets operably associated with said valve member, wherein energization of said permanent magnet causes said permanent magnets to urge said valve member between first and second positions.

20. A flow sensor for measuring the rate of flow of a flowing fluid, said sensor comprising:

a means of induction heating said flowing fluid and maintaining said flowing fluid in the proximity of said induction heating means at a temperature above that of said unheated flowing fluid, and being adapted to generate an output signal indicative of a change in the temperature thereof in response to said fluid flowing in contact therewith; and a detection system responsive to said output signal for extrapolating therefrom a flow signal, said flow signal being representative of a flow rate of said flowing fluid.

21. A flow sensor for measuring a rate of flow of a flowing fluid, said sensor comprising:

first and second temperature sensitive sensing elements in the flowing fluid, said sensing elements being heated;

a modulating system for varying a flow of said flowing fluid over said sensing elements alternately from a maximum to a minimum level to thereby cause said sensing elements to generate cyclic signals indicative of the heat removed from said sensing elements by said flowing fluid, said modulating system comprising:

a central tubular member having a first end and a second end, and said first and second adjacently sensing elements being positioned adjacent to said tubular member and in fluid communication with central tubular member through which said flowing fluid must flow;

a valve member for alternately opening a flow path to only one of said first and second sensing elements at a time, thereby permitting said flowing fluid to flow substantially through only one of said sensing elements at a time;

a system for controlling said valve member comprising an electromagnet a pair of permanent magnets operably associated with said valve member, wherein energization of said electromagnet causes movement of said permanent magnets to cause said valve member to move from a first to a second position wherein said first sensing element is opened to receive said flowing fluid and second sensing element is closed by said valve member, and wherein reversal of the polarity of the current applied to said electromagnet causes said valve member to be urged from second position back into said first posftion, wherein said second sensing element is opened to permit said flowing fluid therethrough;

a temperature sensing device disposed in said flowing fluid for generating an output signal indicative of a temperature of said flowing fluid;

a closed loop feedback monitoring system for monitoring the temperature of said flowing fluid to maintain the average temperature of said sensing elements at a desired increment above said temperature of said flowing fluid; and a system responsive to said sensing elements for detecting the magnitude of an electrical signal therefrom corresponding to a cyclic heat removal rate of said flowing fluid, said magnitude of said electrical signal being a measure of the mass flow rate of said flowing fluid.

22. A method for measuring the flow rate of a flowing fluid, said method comprising the steps of:

directing said flowing fluid into contact with at least a portion of a temperature sensing element;

at least partially circumscribing said temperature sensing element with a coil of an electrically conductive material such that said coil of said electrically conductive material is electrically insulated from said temperature sensing element but in close proximity thereto;

causing an alternating current signal to be passed through said coil of electrically conductive material such that said material electromagnetically induces a current flow through said temperature sensing element, to thereby inductively heat said temperature sensing element suffifcently enough to maintain said element at a temperature above that of said flowing fluid;

monitoring a resistance change of said temperature sensing element indicative of a change in the temperature thereof in response to said element being in contact with said flowing fluid; and using said resistance change to determine said rate of flow of said flowing fluid.

23. The flow sensor of claim 1, wherein said heating and detection system operation includes heating and cooling intervals wherein said element is heated and its temperature detected to sense the temperature of said fluid before said element experiences a significant rise in temperature above that of the said fluid so that said fluid temperature can be thereby detected.

24. A monitoring apparatus for measuring the heat transfer of a fluid from the amount of heat loss of a heated sensing element in contact with the fluid, said apparatus comprising:

an electrically conductive temperature sensing element placed in contact with the fluid;

a current conducting coil disposed in close proximity to said temperature sensing element such that the current flowing in the coil electromagnetically induces a current flow in said sensing element to thereby inductively heat said sensing element and maintain said sensing element at a temperature above that of said fluid; and wherein said sensing element exhibits a resistance change indicative of the change in the temperature thereof in response to the heat removed by said fluid; and a detection system responsive to said resistance change of said sensing element for extrapolating therefrom a signal, said signal being representative of heat transfer between said element and said fluid.

25. The apparatus of claim 24, including a means for measuring the flow rate of said fluid flow so that said detection system can correct said signal for changes in said fluid flow rate.

26. A monitoring apparatus for detecting changes in the presence and properties of a fluid, comprising:

a temperature sensing element having an electrical resistance which varies in relation to its temperature, said element being in contact with said fluid and in close proximity to a current conducting coil such that the coil electromagnetically induces a current flow through the element and thereby heats and maintains said element at a temperature above that of said fluid, said element being adapted to exhibit a resistance change indicative of a fluid temperature rise thereof; and a detection system responsive to said resistance change for extrapolating therefrom a signal, said signal being representative of said changes in said presence and properties of said fluid.

* * * * *